(12) United States Patent
Matsui et al.

(10) Patent No.: US 7,589,747 B2
(45) Date of Patent: Sep. 15, 2009

(54) MIXED REALITY SPACE IMAGE GENERATION METHOD AND MIXED REALITY SYSTEM

(75) Inventors: Taichi Matsui, Kanagawa (JP); Masahiro Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 10/951,684

(22) Filed: Sep. 29, 2004

(65) Prior Publication Data

US 2005/0179617 A1 Aug. 18, 2005

(30) Foreign Application Priority Data

Sep. 30, 2003 (JP) ............................. 2003-341629

(51) Int. Cl.
*G09G 5/00* (2006.01)
(52) U.S. Cl. ...................... 345/633; 345/632; 345/629; 345/7; 345/9
(58) Field of Classification Search ................ 345/7–9, 345/629, 632, 633, 156, 157; 700/9, 83
See application file for complete search history.

(56) References Cited

U.S. PATENT DOCUMENTS

| | | | | |
|---|---|---|---|---|
| 5,815,411 | A * | 9/1998 | Ellenby et al. ............... | 702/150 |
| 5,892,554 | A | 4/1999 | DiCicco et al. ............... | 348/584 |
| 6,094,625 | A * | 7/2000 | Ralston ...................... | 702/150 |
| 6,522,312 | B2 | 2/2003 | Ohshima et al. .............. | 345/8 |
| 6,618,425 | B1 * | 9/2003 | Carlesi et al. ............... | 700/180 |
| 6,977,630 | B1 * | 12/2005 | Donath et al. ................ | 345/9 |
| 2002/0075286 | A1 * | 6/2002 | Yonezawa et al. ............ | 345/679 |
| 2002/0122036 | A1 | 9/2002 | Sasaki ....................... | 345/422 |
| 2002/0191004 | A1 * | 12/2002 | Ebersole et al. .............. | 345/633 |
| 2003/0085866 | A1 * | 5/2003 | Bimber et al. ............... | 345/156 |
| 2003/0185416 | A1 | 10/2003 | Sugiura ...................... | 381/424 |

(Continued)

FOREIGN PATENT DOCUMENTS

JP 8-016102 A 1/1996

(Continued)

OTHER PUBLICATIONS

Webster et al., "Augmented Reality in Architectural Construction, Inspection, and Renovation", 1996.*

(Continued)

*Primary Examiner*—Chante Harrison
(74) *Attorney, Agent, or Firm*—Fitzpatrick, Cella, Harper & Scinto

(57) ABSTRACT

A mixed reality space image generation method for generating a mixed reality space image formed by superimposing a virtual space image onto a real space image obtained by capturing a real space, includes a first image superimposing step of superimposing a first virtual space image onto a real space image based on an occlusion by a real object, wherein the first virtual space image is an outer appearance of the real object, and obtaining information of location and orientation of the real object. In addition, a second virtual image is set based on the information of location and orientation of the real object, and a second image superimposing step superimposes the second virtual space image onto the superimposed image generated in the first image superimposing step without considering the occlusion, wherein the second virtual space image is an annotation associated with the real object.

10 Claims, 10 Drawing Sheets

U.S. PATENT DOCUMENTS

| | | | |
|---|---|---|---|
| 2004/0080467 A1* | 4/2004 | Chinthammit et al. | 345/7 |
| 2005/0174361 A1* | 8/2005 | Kobayashi et al. | 345/633 |
| 2005/0276444 A1* | 12/2005 | Zhou et al. | 345/633 |
| 2005/0285878 A1* | 12/2005 | Singh et al. | 345/633 |
| 2006/0028400 A1* | 2/2006 | Lapstun et al. | 345/8 |
| 2006/0155467 A1* | 7/2006 | Hortner et al. | 701/211 |
| 2006/0241792 A1* | 10/2006 | Pretlove et al. | 700/83 |
| 2007/0006889 A1* | 1/2007 | Kobal et al. | 131/329 |
| 2007/0035563 A1* | 2/2007 | Biocca et al. | 345/633 |
| 2007/0182761 A1* | 8/2007 | Kuroki | 345/632 |

FOREIGN PATENT DOCUMENTS

| | | |
|---|---|---|
| JP | 11-088913 A | 3/1999 |
| JP | 2002-95535 A | 4/2002 |
| JP | 2003-050132 A | 2/2003 |
| JP | 2003-203245 | 7/2003 |
| JP | 2003-296759 A | 10/2003 |
| WO | WO 01/35641 A1 | 5/2001 |
| WO | WO 02/35823 A2 | 5/2002 |

OTHER PUBLICATIONS

Gomes de Sá A. et al.: "Virtual reality as a tool for verification of assembly and maintenance processes", Computers & Graphics, vol. 23, No. 3, Jun. 1, 1999; pp. 389-403.

K. Uratani, et al., "Evaluation for Visualizing Depth Information of Annotations in Augmented Reality Environments", The Institute of Electronics, Information and Communication Engineers, pp. 77-82 (Jul. 11, 2003).

H. Setohara, et al., "Interaction Tools in Augmented Reality", The Institute of Electronics, Information and Communication Engineers, pp. 1-4 (Sep. 29, 2003).

* cited by examiner

MIXED REALITY SPACE IMAGE GENERATION METHOD AND MIXED REALITY SYSTEM

FIELD OF THE INVENTION

The present invention relates to a mixed reality technique for generating a mixed reality space image by superimposing a virtual space image onto a real space image.

BACKGROUND OF THE INVENTION

In recent years, studies about mixed reality that aims at seamless joint of real and virtual spaces have been extensively made. For example, as described in Japanese Patent Laid-Open No. 11-88913 (U.S. Pat. No. 6,522,312), a mixed reality system that presents mixed reality is implemented as a system which presents, to an observer, a mixed reality space image formed by superimposing an image of a virtual space (a virtual object generated by rendering a three-dimensional (3D) model) by computer graphics (CG), text information, and the like onto an image of a real space captured by an image sensing device such as a video camera or the like.

Conventionally, as such mixed reality system, a system that superimposes a CG model as an image of a virtual space onto a miniature as a real object located (present) on a real space is known.

This conventional mixed reality system superimposes an annotation that explains components of the CG model and miniature onto the miniature.

Furthermore, the present application has proposed by Japanese Application No. 2002-95535 (U.S. Patent Pub. No. US2003/185416 A1) a technique for realizing natural display in consideration of the depth (occlusion) so as to prevent an observer's hand from being occluded by a CG model if the observer's hand is located in front of the CG model (i.e., so as not to display the CG model on the region of the hand of the observer).

However, in the conventional mixed reality system when display is made to prevent the observer's hand from being occluded by the CD model, not only the CG model but also an annotation undergo similar display control. For this reason, when the observer's hand overlaps an annotation display, the annotation display of the overlapping portion cannot be observed.

Such annotation often includes information required for the observer to experience mixed reality. If the annotation is occluded, it is inconvenient for the observer. Especially, when comments about the types and operation methods of buttons to be operated by the observer are displayed as an annotation, this problem becomes conspicuous.

Therefore, it is demanded to attain both natural display and convenient display (i.e., the CG model is occluded by the hand but the annotation is not occluded by the hand). However, no such conventional technique is available.

SUMMARY OF THE INVENTION

The present invention has been made in consideration of the conventional problems, and has as its principal object to provide a mixed reality space image generation method and apparatus, which can selectively process an object to be displayed in consideration of occlusion and an object which is not to undergo such control, of virtual space images.

According to an aspect of the present invention, it is provided a mixed reality space image generation method for generating a mixed reality space image formed by superimposing virtual space image onto a real space image obtained by capturing a real space, comprising: a first image superimposing step of superimposing a first virtual space image onto a real space image based on an occlusion by a real object; and a second image superimposing step of superimposing a second virtual space image onto the superimposed image generated in the first image superimposing step without considering the occlusion.

According to another aspect of the present invention, it is provided a mixed reality space image generation apparatus for generating a mixed reality space image formed by superimposing virtual space images onto a real space image obtained by capturing a real space, comprising: first image superimposing unit adapted to superimpose a first virtual space image onto the real space image based on an occlusion by a real object; and second image superimposing unit adapted to superimpose a second virtual space image onto the superimposed image generated by the first image composition unit without considering the occlusion.

According to a further aspect of the present invention, it is provided a mixed reality space image generation method for generating a mixed reality space image formed by superimposing virtual space image onto a real space image obtained by capturing a real space, comprising: obtaining information of location and orientation of an observer; extracting an object region from the real space image; generating a first virtual space image based on the information of location and orientation of an observer; first superimposing the first virtual space image onto the real space image other than the object region; and second superimposing a second virtual space image onto a region of the superimposed image generated in the first superimposing step based on the information of location and orientation of an observer.

According to yet further aspect of the present invention, it is provided a mixed reality space presenting system employing a mixed reality space image generation apparatus of the present invention.

Other objects and advantageous besides those discussed above shall be apparent to those skilled in the art from the description of a preferred embodiment of the invention which follows. In the description, reference is made to accompanying drawings, which from a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

This embodiment will explain a digital mock-up system that exploits an MR (Mixed Reality) technique as a mixed reality system that utilizes a mixed reality space image generation apparatus according to the present invention.

A digital mock-up system according to this embodiment superimposes and presents a three-dimensional computer graphics (3DCG) image that represents a concrete shape and outer appearance of a given industrial product onto a simple mock-up (model) of that product using the MR technique. The system user can actually pick up and touch the mock-up while observing the mock-up superimposed with the 3DCG image of the product, and can virtually operate it.

The mock-up incorporates a position and orientation sensor. 3DCG data is generated in correspondence with the position and orientation of the mock-up detected from the measurement values of that sensor, and is superimposed on the mock-up. For this reason, the user can experience as if he or she were picking up a product represented by the concrete 3DCG image superimposed on the mock-up, although he or she handles the simple mock-up in practice. The digital mock-up system of this embodiment has a function of displaying annotations (component names, functions, how to use, and the like) associated with an industrial product to be experienced.

Figure 1:
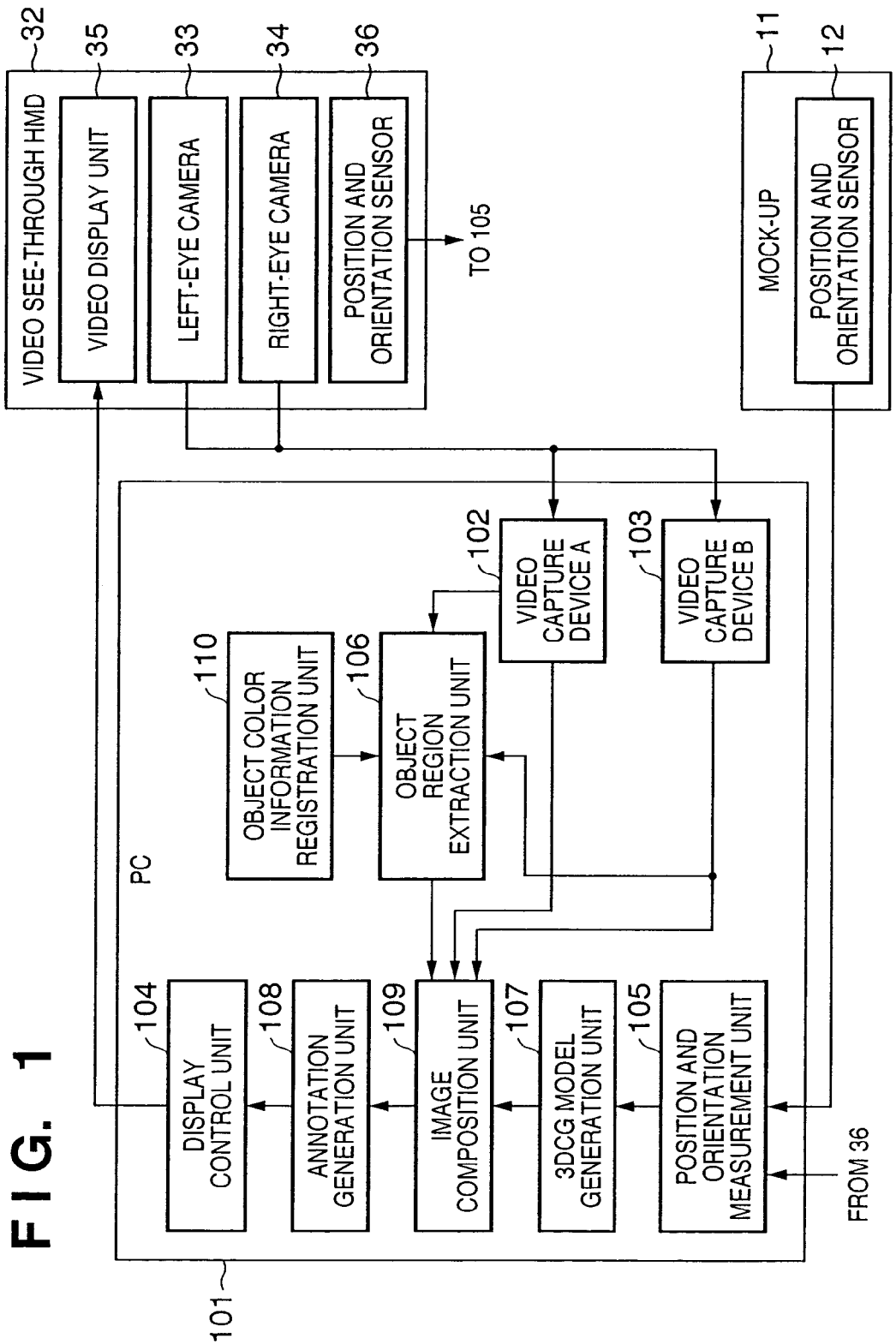
FIG. 1 is a block diagram showing an example of the arrangement of a digital mock-up system according to an embodiment of the present invention.

FIG. 1 is a block diagram showing the system arrangement of the digital mock-up system of this embodiment. A PC 101 is a control unit which controls the entire system, and comprises a video capture device A 102, video capture device B 103, graphic device (display control unit) 104, position and orientation measurement unit 105, object region extraction unit 106, 3DCG model generation unit 107, annotation generation unit 108, image composition unit 109, and object color information registration unit 110.

A video see-through HMD (head-mounted display) 32 has a left-eye camera 33, a right-eye camera 34, a video display unit 35 such as an LCD or the like, and a position and orientation sensor 36 for detecting the viewpoint position and orientation of an observer. The left-eye camera 33 senses a video from the perspective of the left-eye position of the observer. The sensed video is captured by the video capture device A 102. The right-eye camera 34 senses a video from the perspective of the right-eye position of the observer. The sensed video is captured by the video capture device B 103. The video display unit 35 is a display device that presents a mixed reality space image output from the display control unit 104 to the observer. The position and orientation sensor 36 detects the viewpoint position and orientation of the observer, and transmits them to the position and orientation measurement unit 105.

Figure 2:
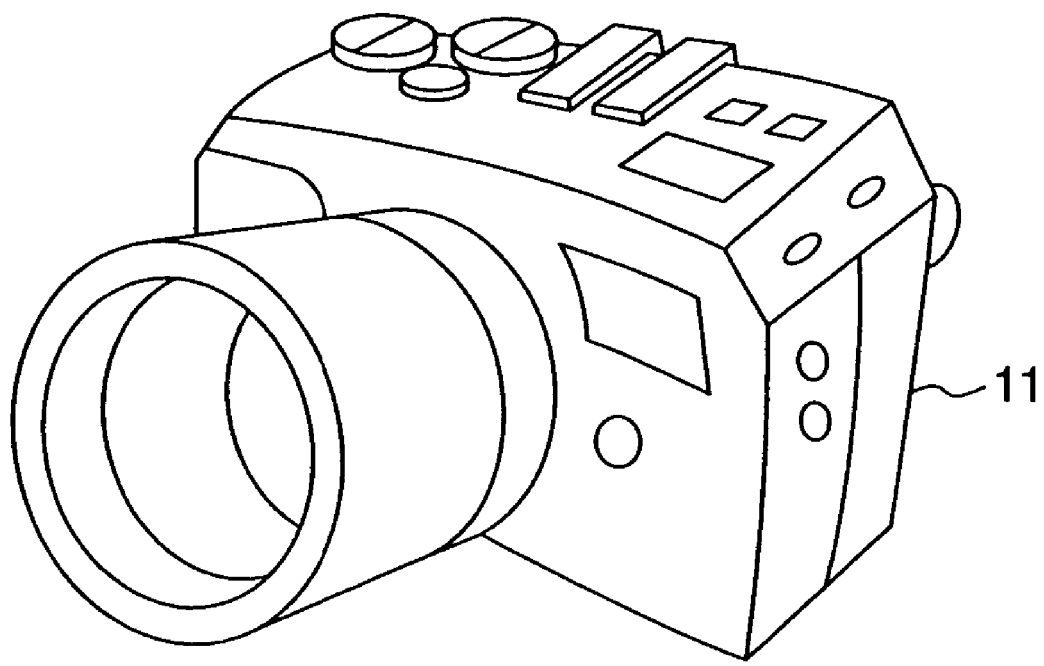
FIG. 2 illustrates a mock-up used in the system shown in FIG. 1.

A mock-up 11 is a full-scale model of a camera in this embodiment, as shown in FIG. 2, and the observer can freely pick it up. This mock-up 11 is a full-scale model of a camera as an industrial product, but it has a solid-color outer appearance and roughly imitates only the outer shape. The weight of the mock-up 11 is substantially equal to that of the actual product to offer a feeling upon operating the actual product to the observer.

The mock-up 11 incorporates a position and orientation sensor 12. The position and orientation sensor 12 is fixed or incorporated at a predetermined position in the mock-up 11, and the positional relationship between the mock-up 11 and position and orientation sensor 12 is constant. For this reason, the position and orientation of the mock-up can be calculated from position/orientation information of the position and orientation sensor 12.

The position and orientation information measured by the position and orientation sensor 12 is transmitted to the position and orientation measurement unit 105 of the PC 101. The position and orientation measurement unit 105 receives position and orientation information from the position and orientation sensor 36 fixed to the HMD, and the position and orientation sensor 12 incorporated in the mock-up. The position and orientation measurement unit 105 executes processes such as coordinate conversion and the like of the received position and orientation information to calculate the viewpoint position and orientation of the observer and the position and orientation of the mock-up 11 on a world coordinate system, and transits them to the 3DCG model generation unit 107.

The 3DCG model generation unit 107 generates 3DCG models (e.g., a CG camera 21 shown in FIG. 3) to be respectively observed from the viewpoints of the right and left eyes of the observer on the basis of the two pieces of received position and orientation information. The unit 107 transmits the generated 3DCG models viewed from the right and left viewpoints to the image composition unit 109.

Figure 3:
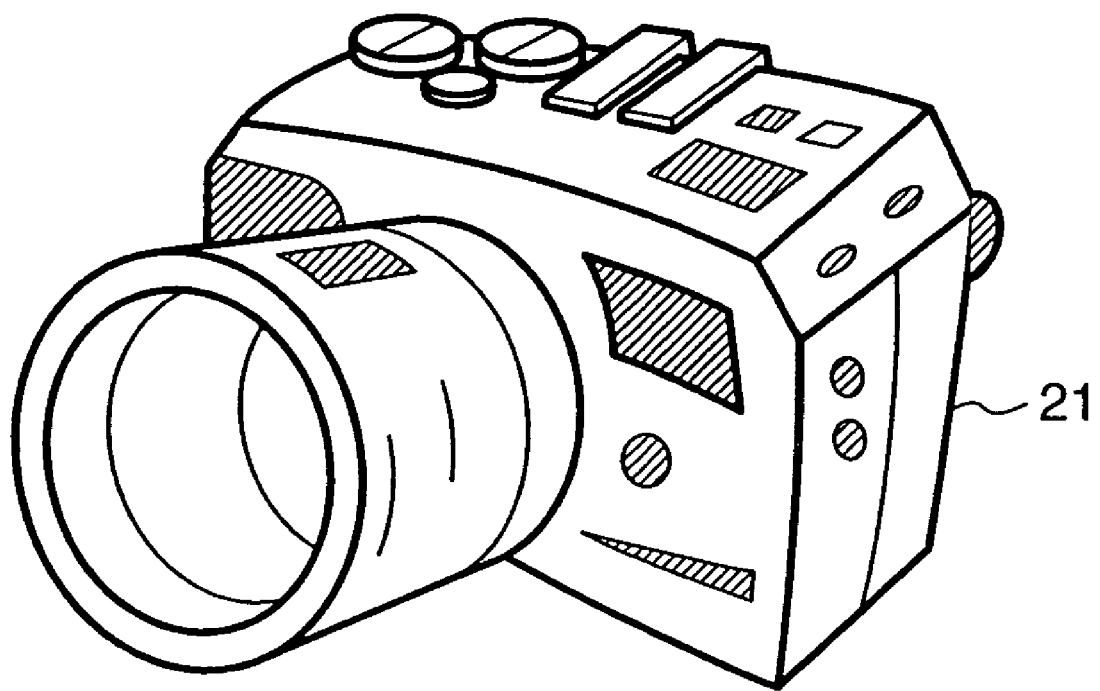
FIG. 3 illustrates a superimposed state of a 3DCG model onto the mock-up shown in FIG. 2.

FIG. 3 illustrates the superimposed state of the CG camera 21 onto the mock-up 11 using the MR technique. The CG camera 21 is a 3DCG model of the camera and has a real size. Of course, the CG camera 21 has the same shape and size as those of the mock-up 11, and they exactly overlap each other when the CG camera 21 is superimposed to match the position and orientation of the mock-up 11.

Right and left videos from the right- and left-eye cameras 34 and 33, which are respectively captured by the video capture devices B 103 and A 102 are respectively transmitted to the image composition unit 109 and object region extraction unit 106.

Figure 7A:
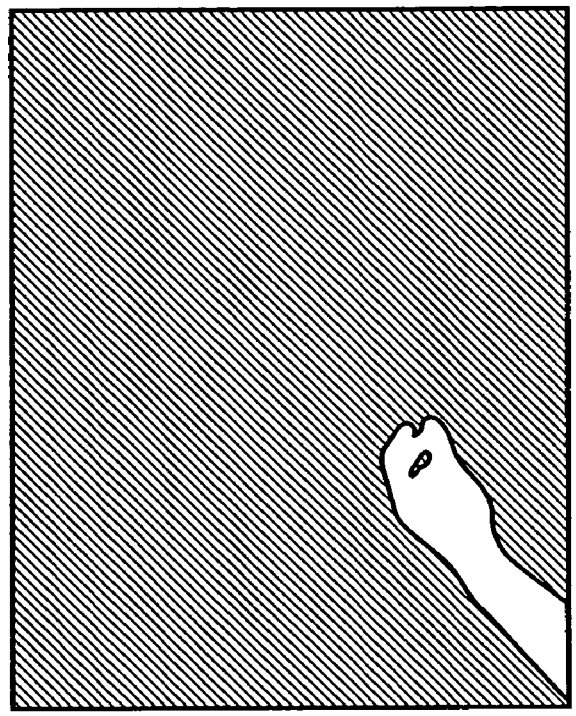
FIGS. 7A and 7B are views for explaining the process of an object region extraction unit 106.
Figure 7B:
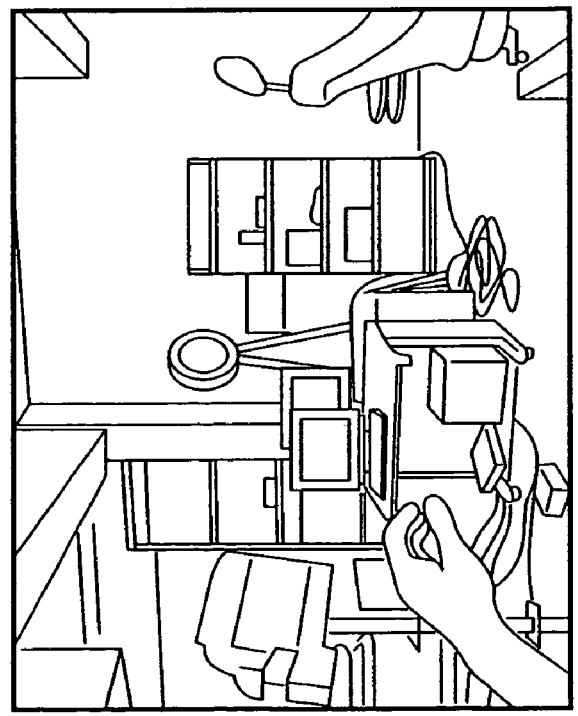

The operation of the object region extraction unit 106 will be explained below using FIGS. 7A and 7B. The object region extraction unit 106 compares color information of each pixel of each of actually captured images (FIG. 7A) captured by the video capture devices A 102 and B 103 with color information of an object, which is registered in advance in the object color information registration unit 110, and determines that a pixel which has a color that matches or is close to the registered color information belongs to an object region. Such determination process is repeated for respective pixels, and right and left object region images are transmitted to the image composition unit 109 in the form of a binary image (FIG. 7B), which is generated so that a pixel included in the object is 1 and a pixel which is not included in the object is 0 as the determination result.

In this embodiment, the object is an observer's hand, and the object color information registration unit 110 registers information associated with a flesh color sampled in advance.

Figure 8:
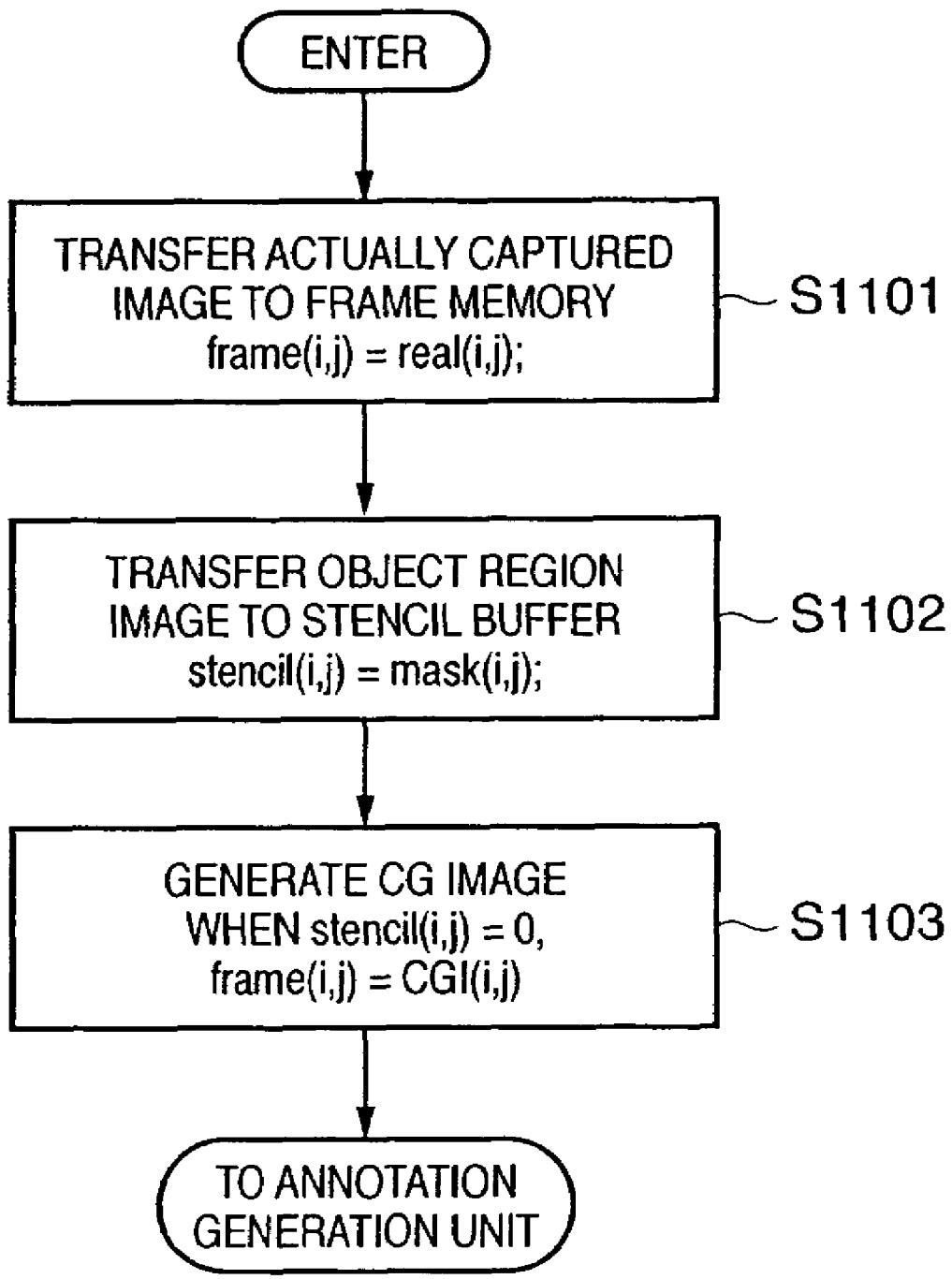
FIG. 8 is a flowchart for explaining the process of an image composition unit 109.

The image composition process in the image composition unit 109 will be described below using FIG. 8. In step S1101, actually captured images from the video camera devices B 103 and A 102 are respectively transferred to right- and left-eye frame buffers (not shown) as image memories for image display. In step S1102, the object region images generated by the object region extraction unit 106 are transferred to right- and left-eye stencil buffers (not shown) as image memories for a mask process.

In step S1103, a stencil buffer value stencil(i, j) is referred to for a pixel at each coordinate position (i, j) of each of the right- and left-eye images. If stencil(i, j)=1, i.e., if a pixel real(i, j) in the actually captured image is included in the object region, a pixel frame(i, j) of the corresponding frame buffer is not updated; if stencil(i, j)=0, i.e., if a pixel real(i, j) in the actually captured image is not included in the object region, and it is a pixel on which the CG camera 21 is to be superimposed, the value of frame(i, j) is replaced by a pixel value CGI(i, j) of the CG camera 21 generated by the 3DCG model generation unit 107. In this way, images (mixed reality space images) obtained by superimposing the CG image onto the actually captured images (only a portion except for the object region) are generated. The generated images are transmitted to the annotation generation unit 108.

Figure 4:
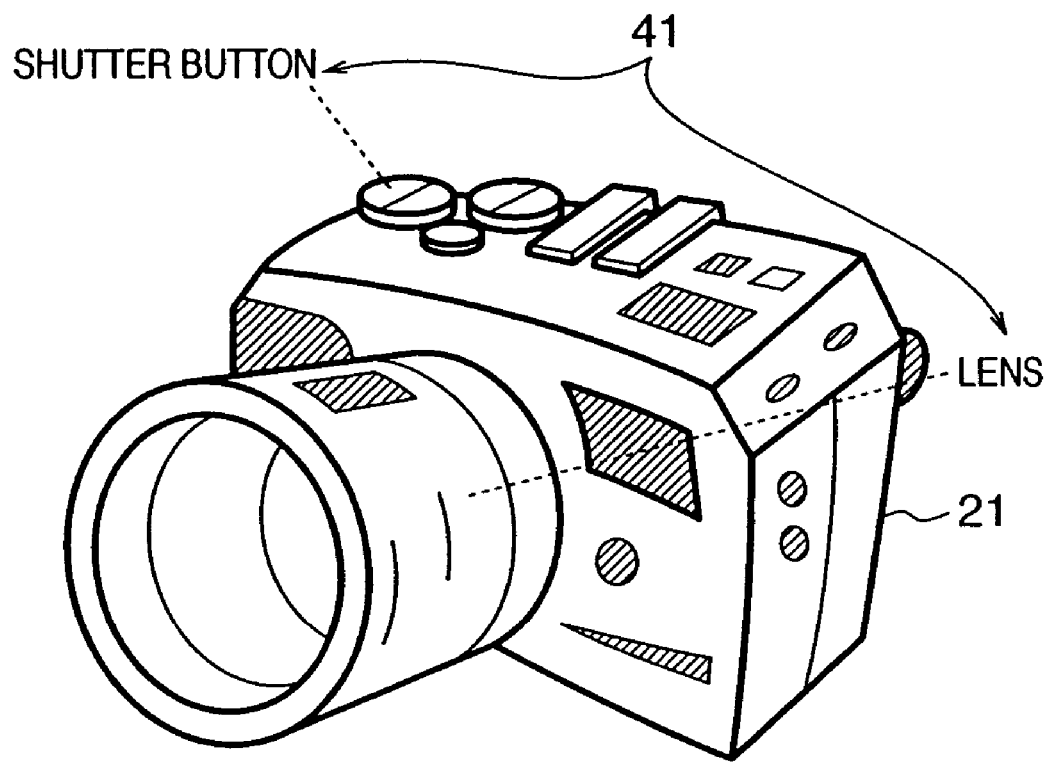
FIG. 4 illustrates a state wherein an annotation is additionally displayed on the state shown in FIG. 3.

The annotation generation unit 108 generates annotations 41 shown in, e.g., FIG. 4 as CG images, and overwrites them on the received right- and left-eye superimposed images to point to predetermined positions (shutter button and lens in FIG. 4) of the 3DCG image. In this embodiment, the annotations 41 are text data which are located on the 3D virtual space and have given positional relationships with the CG camera 21, and their positions and orientations change in conjunction with the CG camera 21 as if they were components of the CG camera 21. Since the annotations are overwritten finally, the observer can visually observe the annotations even when the annotations overlap the object region.

An exemplary method of displaying the annotations 41 to point to correct positions of the 3DCG image is now described. First, acquiring the position and orientation information of the mock-up and the observer from the position and orientation measurement unit 105. Next, determining annotation display positions based on these position and orientation information and positional relationship between the annotations 41 and the CG camera 21. Then, overwriting a text corresponding to the annotations 41 on the determined display positions of an image output from the image composition unit 109.

Figure 6:
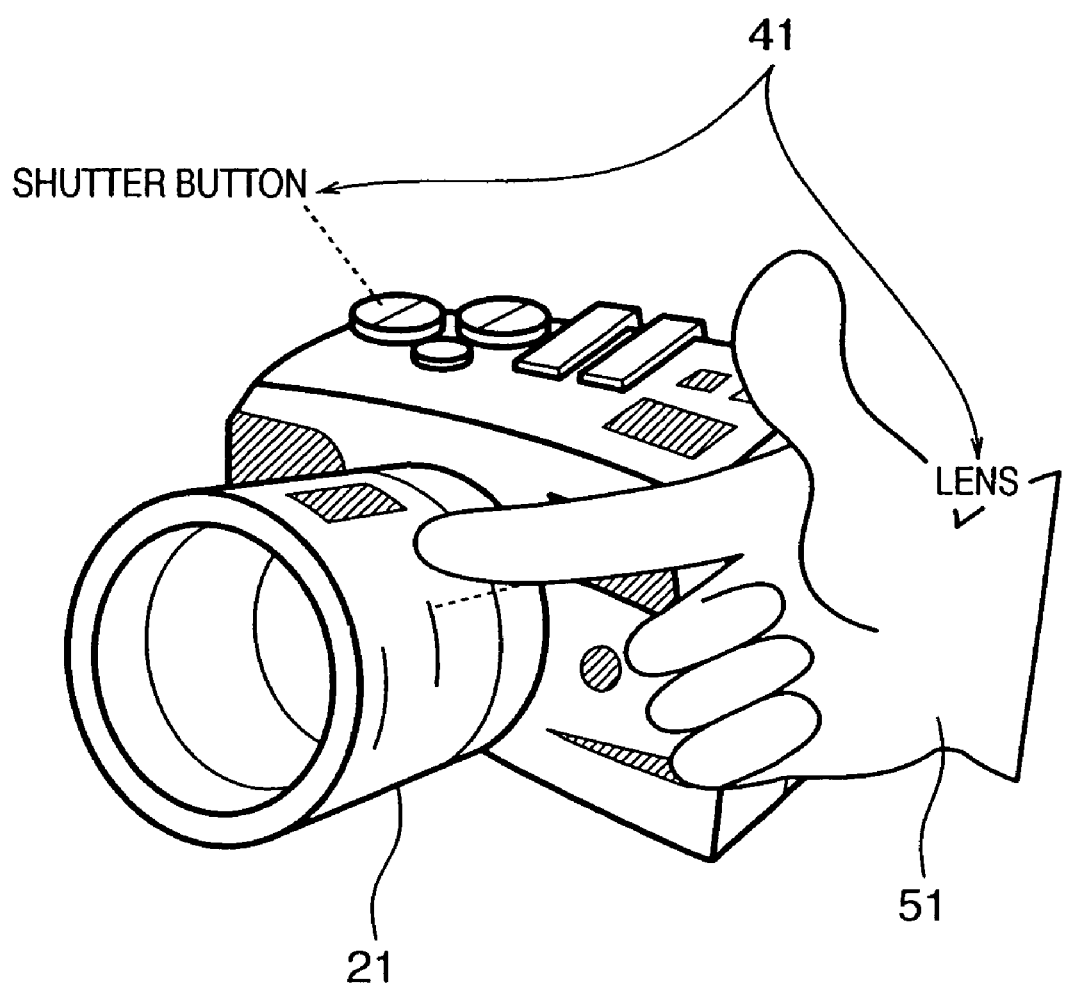
FIG. 6 illustrates a display state in the embodiment of the present invention.

Accordingly, by overwriting annotations on a superimposed image generated by superimposing a 3DCG image onto an actual captured image, a displayed image, e.g., as shown in FIG. 6 can be easily generated with a simple structure.

As an exemplary method of displaying annotations, acquiring image coordinate positions of the shutter button and lens in the 3DCG image from the 3DCG model generation unit 107 and then generating annotations to point to these image coordinate positions, and the like can be adopted. The annotation generation unit 108 transmits the mixed reality space images overwritten with the annotations to the display control unit 104.

Figure 5:
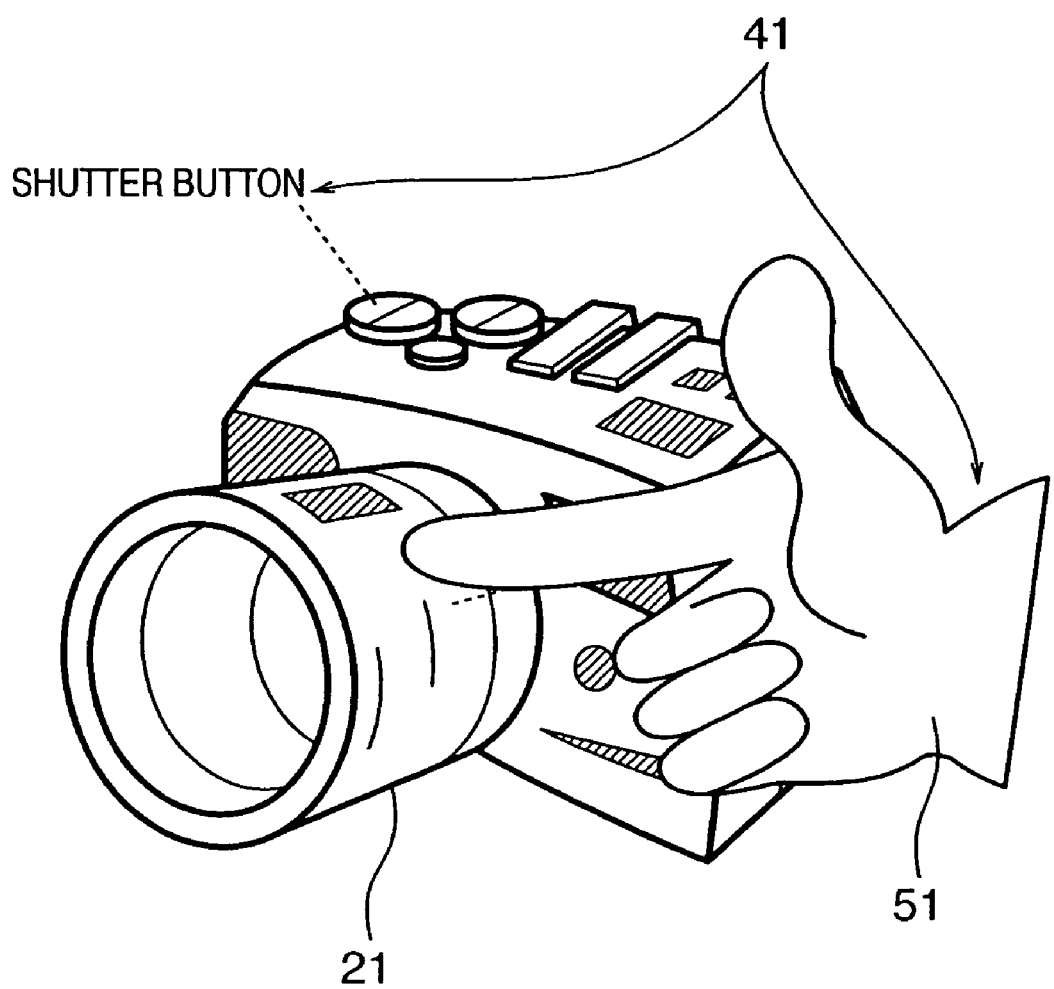
FIG. 5 is a view for explaining a conventional state wherein an annotation is occluded by an observer's hand.

FIG. 5 shows the display state upon displaying annotations shown in FIG. 4 using the conventional method. FIG. 5 shows a display example in which the observer's hand is extracted as an object region which is used as a mask, so as to prevent the observer's hand from being occluded by the CG camera 21. In this display example, the CG camera 21 is occluded by the observer's hand 51 to express a state wherein the CG camera 21 is located at the far side of the hand position. At the same time, however, the annotation 41 for the lens is occluded and cannot be read.

On the other hand, in this embodiment, since the annotations are overwritten finally, even when the object region (i.e., the observer's hand) is located at the position shown in FIG. 5, the annotation is displayed on the hand, and the observer can read that annotation. That is, the observer can read the annotation independently of the location of the object region while making natural display in consideration of the depth.

The display control unit 104 transmits right- and left-eye mixed reality space images to the video display unit 35 of the video see-through HMD 32, and the video display unit 35 receives and displays these images.

Figure 9:
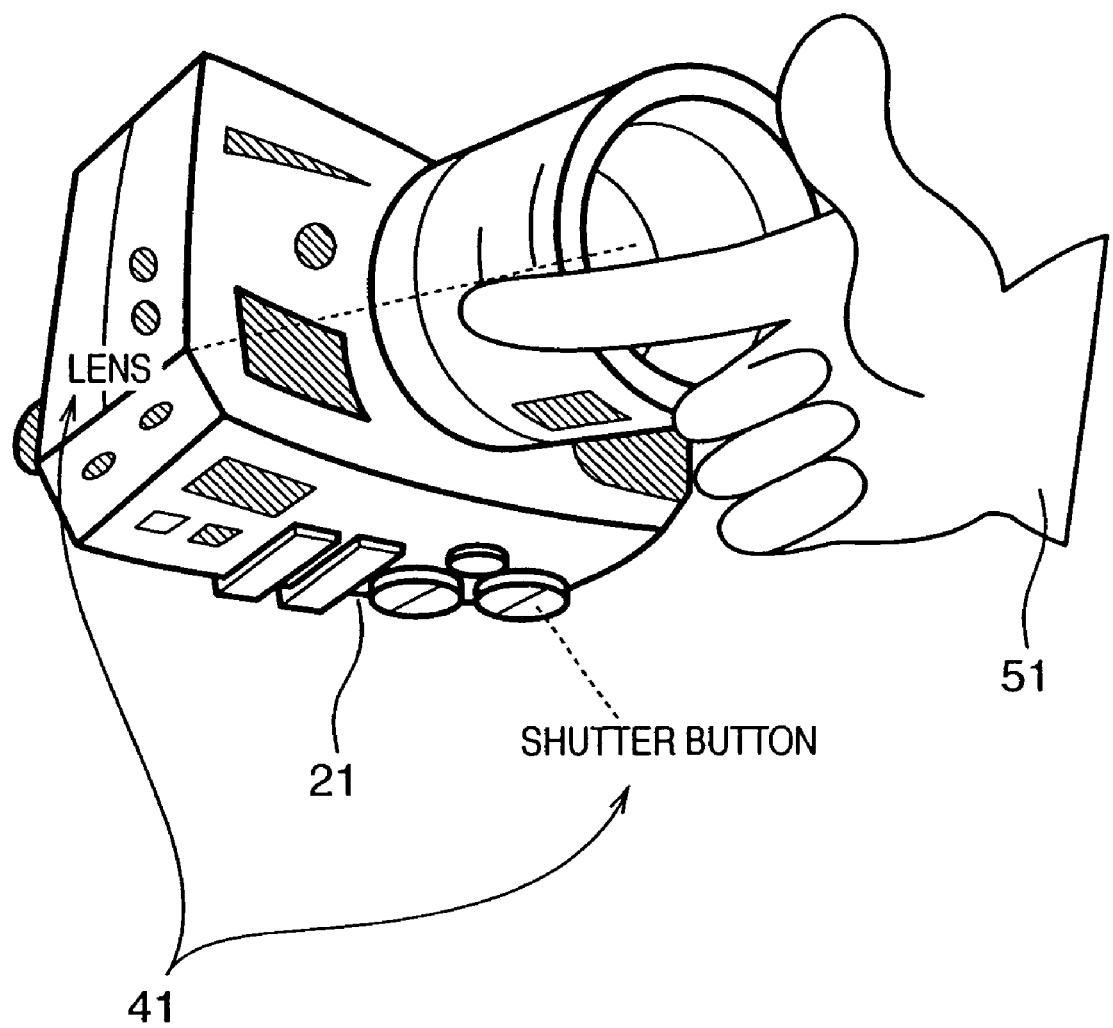
FIG. 9 shows an annotation display state when the orientation of the mock-up has changed.

In this embodiment, even when the orientation of the mock-up 11 has changed, as shown in FIG. 9, or when the orientation of the observer has changed, the annotations are always displayed on a plane (display plane) perpendicular to a straight line from the viewpoint of the observer to the mock-up in the same direction as the orientation of the observer. In this manner, the annotations are readably displayed for the observer irrespective of the orientations of the mock-up and observer.

The position and orientation sensor 12 provided to the mock-up 11 may detect its direction, and annotation display may be made in accordance with the detected direction of the mock-up 11. For example, in this embodiment, when the front surface of the camera (a surface that the object faces) faces the observer, annotations for the range viewed from the front surface side can be displayed; when the back surface faces the observer, annotations for the range viewed from the back surface side can be displayed.

Figure 10:
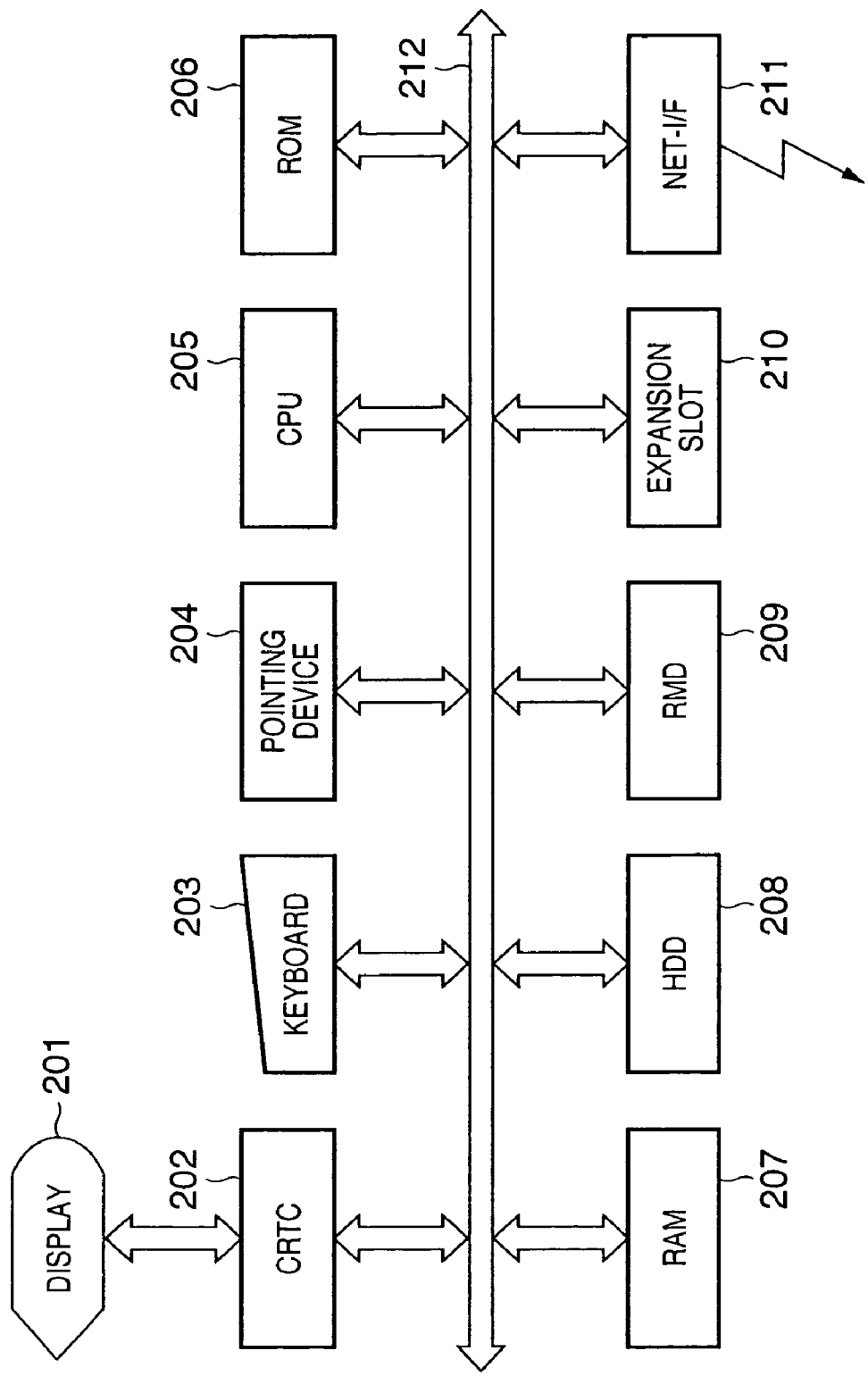
FIG. 10 is a block diagram showing an example of the arrangement of a general-purpose computer that can be used as a PC 101.

FIG. 10 is a block diagram showing an example of the arrangement of a computer which can be used as the PC 101 in this embodiment.

Referring to FIG. 10, a display 201 displays information of data which is being processed by an application program, various message menus, and the like, and comprises a CRT (Cathode Ray Tube), LCD (Liquid Crystal Display), or the like. A CRTC 202 as a display controller makes screen display control of the display 201. A keyboard 203 and pointing device 204 are used to input characters, and to designate icons, buttons, and the like on a GUI (Graphical User Interface). A CPU 205 controls the overall computer.

A ROM (Read Only Memory) 206 stores programs to be executed by the CPU 205, parameters, and the like. A RAM (Random Access Memory) 207 is used as a work area when the CPU 205 executes various programs, a temporary save area in an error process, and the like.

A hard disk drive (HDD) 208 and removable media drive (RMD) 209 serve as external storage devices. The removable media drive is a device for reading/writing information from/on or reading information from a removable recording medium. The removable media drive may comprise a flexible disk drive, optical disk drive, magnetooptical disk drive, or memory card reader, or may comprise a removable HDD or the like.

Note that programs (e.g., application programs, and error processing programs) that implement various functions of the PC 101 described in this embodiment, an OS, other application programs such as a browser and the like, data, libraries, and the like are stored in one or more of the ROM 206, HDD 208, and (recording medium of) RMD 209 according to their purposes.

An expansion slot 210 is an expansion card slot complying with, e.g., the PCI (Peripheral Component Interconnect) bus standard, and can connect various expansion boards such as a video capture board, sound board, GPIB board, and the like.

A network interface 211 is used to connect the computer to a computer network. A bus 212 includes an address bus, data bus, and control bus, and interconnects the aforementioned units. The computer also has a serial interface such as RS-232C, RS-422, USB (Universal Serial Bus), IEEE1394, or the like, and a parallel interface such as IEEE1284 or the like and can connect external devices such as a modem, printer, and the like.

Such general-purpose computer can communicate with another device on the computer network or public telephone network using the OS, required driver software, and the like, and a router (including a dial-up router) connected as needed via the network interface 211 or a modem, TA, or the like connected via the serial interface.

When the general-purpose computer shown in FIG. 10 is used as the PC 101, the video capture devices A 102 and B 103, and the position and orientation measurement unit 105 are implemented as, e.g., a video capture board and an interface board with the position and orientation sensors 12 and 36, which are connected to the expansion slot, and their control programs. Also, the object region extraction unit 106, 3DCG model generation unit 107, annotation generation unit 108, and image composition unit 109 can be implemented when the CPU 105 executes software. The display control unit 104 is implemented by the CRTC 201.

As described above, according to this embodiment, visually natural display in consideration of the depth (occlusion) and display in consideration of the observer's convenience can be achieved at the same time.

Another Embodiment

In the above embodiment, the mixed reality system including the HMD and mock-up has been explained to help easy understanding, but they are not always required. Components associated with acquisition of a real space image, display of a mixed reality space image, and position and orientation measurements of the mock-up and observer's viewpoint are not indispensable, and acquisition and display processes of such images and information may be done by an external apparatus.

In the aforementioned embodiment, the object region is detected by comparing a color registered in the object color information registration unit with each pixel in the image. However, for example, if the object is the observer's hand, and if it is determined based on the output value of the position and orientation sensor of the mock-up that the observer holds the mock-up, a color region which is different from the color of the mock-up may be extracted from a mock-up portion in the actually captured image and may be determined as an object region, or an object region may be obtained by the aforementioned method using a color of that region as the object color information. By dynamically setting object color information or detecting the object region in this way, various situations (e.g., when the observer wears gloves) can be coped with.

In the aforementioned embodiment, the present invention is applied to the mock-up system exploiting mixed reality. However, the present invention is not limited to an application that displays a virtual space image which represents the outer appearance of a real object, but it can be applied to arbitrary other applications and mixed reality systems in which virtual space images to be displayed include those to be displayed in consideration of the depth (occlusion) and those which need not undergo such control. Therefore, a virtual space image which is to be displayed without considering any occlusion is not limited to an annotation but may be an arbitrary virtual space image.

In the aforementioned embodiment, the object is the observer's hand, but may be an instrument to be operated by the observer, other body regions, or a real object other than the observer.

In the above embodiment, the PC 101 is configured by a single device. However, the equivalent functions may be implemented by a system including a plurality of devices.

Note that the present invention includes a case wherein the equivalent functions are achieved by supplying a software program that implements the functions of the aforementioned embodiments directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-341629 filed on Sep. 30, 2003, which is hereby incorporated by reference herein.

What is claimed is:

1. A mixed reality space image generation method for generating a mixed reality space image formed by superimposing a virtual space image onto a real space image obtained by capturing a real space, comprising:
   obtaining information of location and orientation of an observer;
   obtaining information of location and orientation of a real object;
   extracting an object region from the real space image;
   generating a first virtual space image based on the information of location and orientation of an observer;
   first superimposing the first virtual space image onto the real space image other than the object region; and
   second superimposing a second virtual space image onto the superimposed image generated in the first superimposing step based on the information of location and orientation of an observer,
   wherein the first and second virtual images are generated based on the information of location and orientation of the real object and the information of location and orientation of the observer, and
   wherein said steps are performed on a computer.

2. The method according to claim 1, wherein the second virtual space image is an annotation.

3. A mixed reality space image generation method for generating a mixed reality space image formed by superimposing a virtual space image onto a real space image obtained by capturing a real space, comprising:
   obtaining information of location and orientation of an observer;
   extracting an object region from the real space image;
   generating a first virtual space image based on the information of location and orientation of an observer;
   first superimposing the first virtual space image onto the real space image other than the object region; and
   second superimposing a second virtual space image onto the superimposed image generated in the first superimposing step,
   wherein the second virtual space image is a text image, and the second superimposing step determines a position of the superimposed image on which the second virtual space image is to be overwritten based on a relation between the first and second virtual space images, the information of location and orientation of the observer and the information of location and orientation of the real object, and superimposes the text image on the determined position of the superimposed image generated in the first superimposing step, and
   wherein said steps are performed on a computer.

4. The method according to claim 3, wherein the second virtual space image is an annotation.

5. A mixed reality space image generation apparatus for generating a mixed reality space image formed by superimposing a virtual space image onto a real space image obtained by capturing a real space, comprising:
   a first obtaining unit to obtain information of location and orientation of an observer;
   a second obtaining unit to obtain information of location and orientation of a real object;
   an extracting unit to extract an object region from the real space image;
   a generation unit to generate a first virtual space image based on the information of location and orientation of an observer;
   a first superimposing unit to superimpose the first virtual space image onto the real space image other than the object region; and
   a second superimposing unit to superimpose a second virtual space image onto the superimposed image generated in the first superimposing step based on the information of location and orientation of an observer,
   wherein the first and second virtual images are generated based on the information of location and orientation of the real object and the information of location and orientation of the observer.

6. The apparatus according to claim 5, wherein the second virtual space image is an annotation.

7. A mixed reality space generation apparatus for generating a mixed reality space image formed by superimposing a virtual space image onto a real space image obtained by capturing a real space, comprising:
   an obtaining unit to obtain information of location and orientation of an observer;
   an extracting unit to extract an object region from the real space image;
   a generation unit to generate a first virtual space image based on the information of location and orientation of an observer;
   a first superimposing unit to superimpose the first virtual space image onto the real space image other than the object region; and
   a second superimposing unit to superimpose a second virtual space image onto a region of the superimposed image generated by the first superimposing unit,
   wherein the second virtual space image is a text image, and the second superimposing unit determines a position of the superimposed image on which the second virtual space image is to be overwritten based on a relation between the first and second virtual space images, the information of location and orientation of the observer and the information of location and orientation of the real object, and superimposes the text image on the determined position of the superimposed image generated by the first superimposing unit.

8. The apparatus according to claim 7, wherein the second virtual space image is an annotation.

9. A computer-readable recording medium storing a program to implement a mixed reality space image generation method for generating a mixed reality space image formed by superimposing a virtual space image onto a real space image obtained by capturing a real space, comprising:
   obtaining information of location and orientation of an observer;
   obtaining information of location and orientation of a real object;
   extracting an object region from the real space image;
   generating a first virtual space image based on the information of location and orientation of an observer;

first superimposing the first virtual space image onto the real space image other than the object region; and second superimposing a second virtual space image onto the superimposed image generated in the first superimposing step based on the information of location and orientation of an observer, wherein the first and second virtual images are generated based on the information of location and orientation of the real object and the information of location and orientation of the observer, and wherein said steps are performed on a computer.

10. A computer-readable recording medium storing a program to implement a mixed reality space generation method for generating a mixed reality space image formed by superimposing virtual space image onto a real space image obtained by capturing a real space, comprising:

obtaining information of location and orientation of an observer;

extracting an object region from the real space image;

generating a first virtual space image based on the information of location and orientation of an observer;

first superimposing the first virtual space image onto the real space image other than the object region; and second superimposing a second virtual space image onto the superimposed image generated in the first superimposing step, wherein the second virtual space image is a text image, and the second superimposing step determines a position of the superimposed image on which the second virtual space image is to be overwritten based on a relation between the first and second virtual space images, the information of location and orientation of the observer and the information of location and orientation of the real object, and superimposes the text image on the determined position of the superimposed image generated in the first superimposing step.

* * * * *